US012578861B2

(12) United States Patent (10) Patent No.: US 12,578,861 B2
Yun et al. (45) Date of Patent: Mar. 17, 2026

(54) MEMORY SYSTEM WITH MULTIPLE MEMORY RANKS AND METHOD OF OPERATING THE MEMORY SYSTEM WITH MULTIPLE MEMORY RANKS

(71) Applicant: SK hynix Inc., Icheon-si (KR)

(72) Inventors: Da Yeon Yun, Icheon-si (KR);
Dong-Gun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 84 days.

(21) Appl. No.: 18/462,965

(22) Filed: Sep. 7, 2023

(65) Prior Publication Data

US 2024/0289020 A1 Aug. 29, 2024

(30) Foreign Application Priority Data

Feb. 24, 2023 (KR) ........................ 10-2023-0025415

(51) Int. Cl.
*G06F 3/06* (2006.01)
*G06F 13/16* (2006.01)
(52) U.S. Cl.
CPC .......... *G06F 3/0611* (2013.01); *G06F 3/0629* (2013.01); *G06F 3/0673* (2013.01); *G06F 13/1626* (2013.01); *G06F 13/1642* (2013.01)

(58) Field of Classification Search
CPC .... G06F 3/0611; G06F 3/0629; G06F 3/0673; G06F 13/1629; G06F 13/1642; G06F 3/0659; G06F 3/0679; G06F 3/0604; G06F 3/0614; G06F 3/0658; G06F 3/0683; G06F 2212/1016; G06F 2212/1032
See application file for complete search history.

(56) References Cited

U.S. PATENT DOCUMENTS

2009/0248994 A1 10/2009 Zheng et al.
2011/0158008 A1* 6/2011 Nishimura ........... G11C 7/1066
365/189.15
2014/0372711 A1* 12/2014 O'Connor ........... G06F 13/1694
711/151
2018/0173428 A1* 6/2018 Bonanno ............... G06F 3/0659
2019/0065243 A1* 2/2019 Eckert ................... G06F 1/3225

* cited by examiner

*Primary Examiner* — Scott T Baderman
(74) *Attorney, Agent, or Firm* — WILLIAM PARK AND ASSOCIATES LTD.

(57) ABSTRACT

A memory system includes a plurality of memory ranks, and a memory controller configured to control the plurality of memory ranks. The memory controller performs scheduling such that a request to be processed first is selected based on a counting value obtained by counting requests with the plurality of memory ranks as target memory ranks.

19 Claims, 13 Drawing Sheets

| REQUEST | TARGET MEMORY RANK | ADDR | WRITE DATA | STATE OF READINESS |
|---------|--------------------|------|------------|---------------------|
| 1ST ENTRY → REQ_W0 | RANK0 | ADDR0 | WD0 | A (01) |
| 2ND ENTRY → REQ_W1 | RANK0 | ADDR1 | WD1 | B (00) |
| 3RD ENTRY → REQ_W2 | RANK1 | ADDR2 | WD2 | C (10) |
| 4TH ENTRY → REQ_W3 | RANK0 | ADDR3 | WD3 | C (10) |
| 5TH ENTRY → REQ_W4 | RANK1 | ADDR4 | WD4 | A (01) |
| 6TH ENTRY → REQ_W5 | RANK1 | ADDR5 | WD5 | A (01) |
| 7TH ENTRY → REQ_W6 | RANK1 | ADDR6 | WD6 | C (10) |
| 8TH ENTRY → REQ_W7 | RANK1 | ADDR7 | WD7 | B (00) |

FIG.11

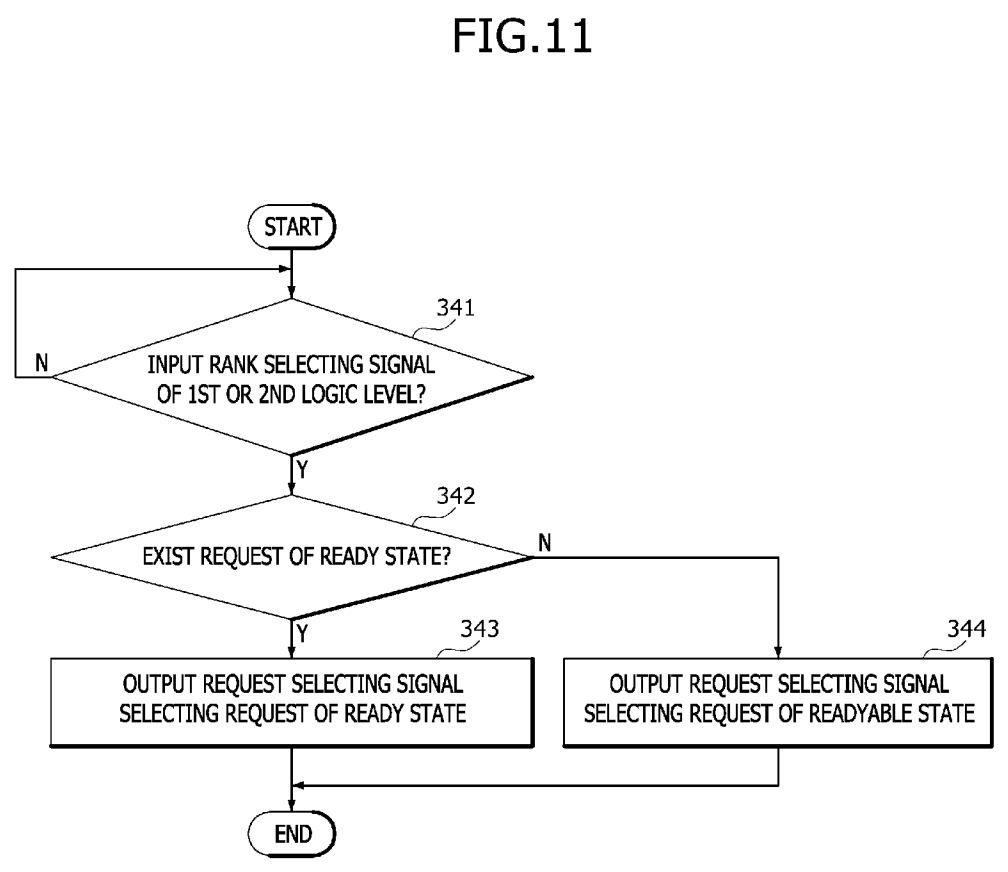

START

341
INPUT RANK SELECTING SIGNAL
OF 1ST OR 2ND LOGIC LEVEL?

N

Y

342
EXIST REQUEST OF READY STATE?

N

Y

344
OUTPUT REQUEST SELECTING SIGNAL
SELECTING REQUEST OF READYABLE STATE

343
OUTPUT REQUEST SELECTING SIGNAL
SELECTING REQUEST OF READY STATE

END

FIG.12

PTR →

| REQ_W0 | REQ_W1 | REQ_W2 | REQ_W3 | REQ_W4 | REQ_W5 | REQ_W6 | REQ_W7 |
|--------|--------|--------|--------|--------|--------|--------|--------|
| A | B | C | C | A | A | A | B |
| RANK0 | RANK0 | RANK1 | RANK0 | RANK1 | RANK1 | RANK1 | RANK1 |

| | |
|---|---|
| 1ST COUNTING VALUE (CNT0) | 2 |
| 2ND COUNTING VALUE (CNT1) | 4 |
| REQUEST THRESHOLD (REQ_TH) | 3 |

FIG.13

MEMORY SYSTEM WITH MULTIPLE MEMORY RANKS AND METHOD OF OPERATING THE MEMORY SYSTEM WITH MULTIPLE MEMORY RANKS

CROSS-REFERENCE TO RELATED APPLICATIONS

The present application claims priority under 35 U.S.C. 119(a) to Korean Patent Application No. 10-2023-0025415, filed on Feb. 24, 2023, in the Korean Intellectual Property Office, which is incorporated herein by reference in its entirety.

BACKGROUND

1. Technical Field

Various embodiments of the present disclosure generally relate to a memory system and a method of operating the memory system, and more particularly, to a memory system including a plurality of memory ranks and a method of operating the memory system including the plurality of memory ranks.

2. Related Art

Multi-core processors are widely used not only in general PCs but also in embedded systems due to their advantages such as low power consumption and improved computing power. Recently, there is a tendency to increase the number of processor cores in order to speed up calculations. However, as the number of processor cores increases, the performance improvement of the entire system is limited due to an increase in main memory access latency. Therefore, a method for improving access performance of main memory is required.

SUMMARY

The present disclosure may provide a semiconductor system including a plurality of memory ranks, and a memory controller configured to control the plurality of memory ranks. The memory controller is configured to perform a counting operation on available requests targeting the plurality of memory ranks, based on states of readiness of the requests, to select a target memory rank from among the plurality of memory ranks, based on a result of the counting operation, and to perform scheduling to implement the request of the selected target memory rank.

In addition, the present disclosure may provide a method of operating a semiconductor system including a plurality of memory ranks and a memory controller configured to control the plurality of memory ranks. The method may include counting a request for each of the plurality of memory ranks to output a plurality of counting values corresponding to the plurality of memory ranks, and performing a comparing operation, a rank transition operation, and a request selecting operation, based on the plurality of counting values.

BRIEF DESCRIPTION OF THE DRAWINGS

FIG. 1 is a block diagram illustrating a memory system according to an embodiment of the present disclosure.

FIG. 3 is a diagram illustrating an embodiment of a request storage included in the memory controller of FIG. 2.

FIG. 11 is a flowchart illustrating a request selecting operation in the method of operating a memory system according to the present disclosure.

FIG. 12 is a diagram illustrating an embodiment of a method of operating the memory system according to the present disclosure.

FIG. 13 is a block diagram illustrating a memory system according to another embodiment of the present disclosure.

DETAILED DESCRIPTION

Figure 2:
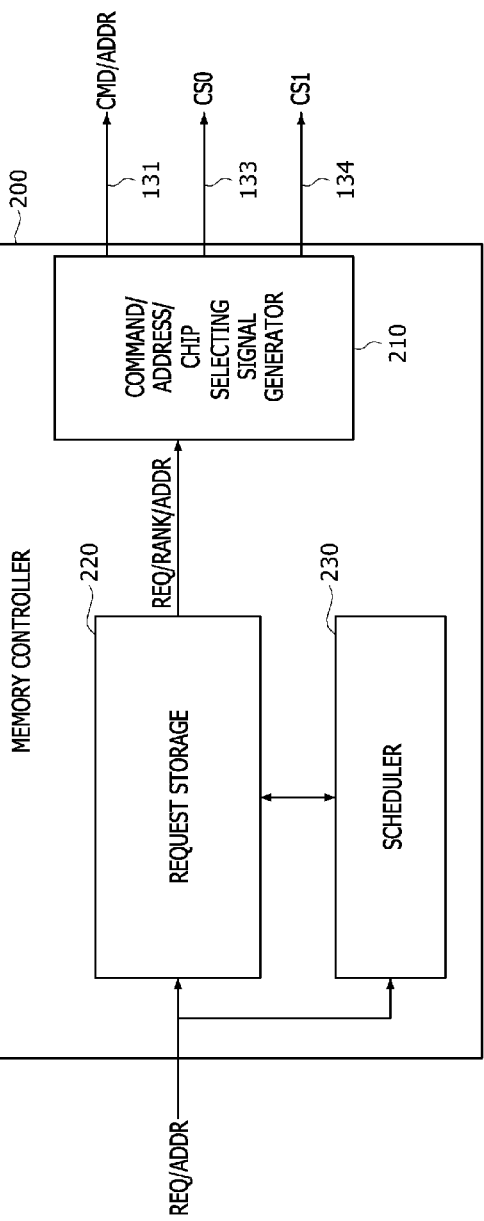
FIG. 2 is a block diagram illustrating an embodiment of a memory controller included in the memory system of FIG. 1.

In the following description of embodiments, it will be understood that although the terms "first," "second," "third," etc. are used herein to describe various elements, these elements should not be limited by these terms. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. The term "preset" means that the value of a parameter is predetermined when using that parameter in a process or algorithm. The value of the parameter may be set when a process or algorithm starts or may be set during a period during which a process or algorithm is performed, depending on embodiments.

A logic "high" level and a logic "low" level may be used to describe logic levels of signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, the logic levels of signals may be set to be different or opposite according to the embodiments. For example, a certain signal having a logic "high" level in one embodiment may be set to have a logic "low" level in another embodiment, and a certain signal having a logic "low" level in one embodiment may be set to have a logic "high" level in another embodiment.

Various embodiments of the present disclosure will be described hereinafter in more detail with reference to the accompanying drawings. Various embodiments described below take DRAM as an example as a memory device, but it is obvious that it is not limited thereto. For example, the same can be applied to static random access memory (SRAM), Synchronous DRAM (SDRAM), double data rate synchronous DRAM (DDR SDRAM, DDR2 SDRAM, DDR3 SDRAM, etc.), graphics double data rate synchronous DRAM (GDDR, GDDR2, GDDR3, etc.), quad data rate DRAM (QDR DRAM), RAMBUS XDR DRAM (XDR DRAM), fast page mode DRAM (FPM DRAM), video DRAM (VDRAM), extended data output DRAM (EDO DRAM), burst EDO DRAM (BEDO DRAM), multi-bank DRAM (MDRAM), synchronous graphic RAM (SGRAM), and/or other types of DRAM.

As one of the methods for improving the memory access performance of the multi-core processor system, a method of applying a plurality of memory ranks to the memory system has been applied. Unlike a structure in which memory chips in a memory system share one chip selecting signal, the plurality of memory ranks may operate independently by different chip selecting signals. In the memory system including a plurality of memory ranks, it is known that throughput performance can be improved compared to the in-order scheduling method when a commonly used first-ready first-come-first-served (FR-FCFS) scheduling method is applied. However, when the FR-FCFS scheduling method is applied, a phenomenon in which requests for specific memory ranks are concentrated may occur.

Figure 1:
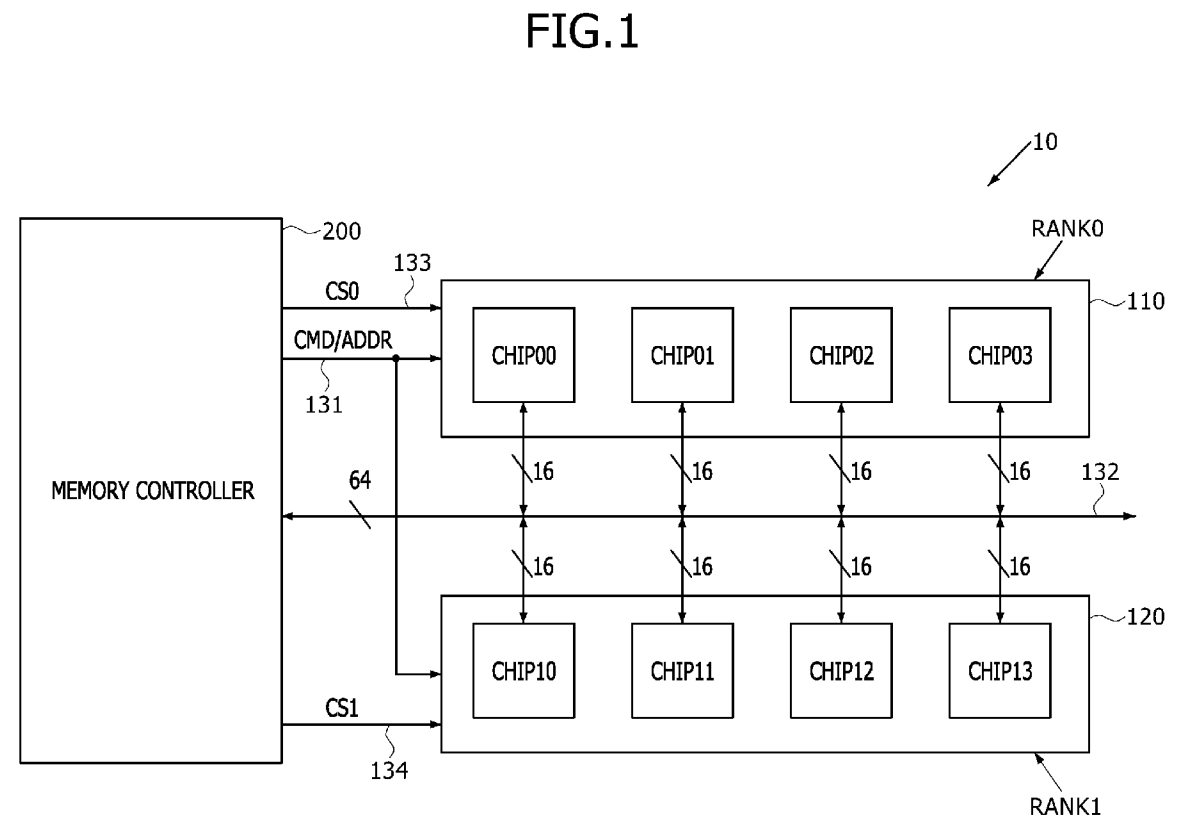

FIG. 1 is a block diagram illustrating a memory system according to an embodiment of the present disclosure. Referring to FIG. 1, the memory system 10 may include a plurality of memory ranks 110 and 120, and a memory controller 200. The plurality of memory ranks 110 and 120 may include a first memory rank 110 and a second memory rank 120. In various embodiments, the memory system 10 may include more than two memory ranks, for example, four or eight memory ranks, and in this case, the following descriptions may be equally applied.

In an embodiment, the first memory rank 110 and the second memory rank 120 may constitute one memory module. Each of the first memory rank 110 and the second memory rank 120 may include a plurality of memory chips. Hereinafter, a case in which the first memory rank 110 includes four memory chips CHIP00-CHIP03 will be described as an example. Similarly, a case in which the second memory rank 120 also includes four memory chips CHIP10-CHIP13 will be described as an example. Each of the memory chips CHIP00-CHIP03 of the first memory rank 110 and each of the memory chips CHIP10-CHIP13 of the second memory rank 120 may include a plurality of memory banks. In an embodiment, each of the memory chips CHIP00-CHIP03 of the first memory rank 110 and each of the memory chips CHIP10-CHIP13 of the second memory rank 120 may be a DRAM chip.

The first memory rank 110 may be coupled to a command/address line 131, a main data bus 132, and a first chip selecting line 133. The second memory rank 120 may be coupled to the command/address line 131, the main data bus 132, and a second chip selecting line 134. That is, the first memory rank 110 and the second memory rank 120 may be commonly coupled to the command/address line 131 and the main data bus 132, but coupled to different chip selecting lines. Each of the first memory rank 110 and the second memory rank 120 may receive a command/address CMD/ADDR through the command/address line 131. The command/address CMD/ADDR transmitted through the command/address line 131 may be commonly transmitted to the memory chips CHIP00-CHIP03 of the first memory rank 110 and the memory chips CHIP10-CHIP13 of the second memory rank 120.

Each of the first memory rank 110 and the second memory rank 120 may be coupled to the main data bus 132 through first internal data buses and second internal data buses, respectively. The main data bus 132 may be disposed between the first and second memory ranks 110 and 120 and the memory controller 200 to provide data transmission paths. The first internal data buses may be disposed between the first memory rank 110 and the main data bus 132. The second internal data buses may be disposed between the second memory rank 120 and the main data bus 132. A data width of the main data bus 132 may be the same as a total data width of the first internal data buses of the first memory rank 110. In addition, the data width of the main data bus 132 may be the same as a total data width of the second internal data buses of the second memory rank 120. The term "data width" may mean the maximum number of bits of data which can be simultaneously transmitted through a data bus. Hereinafter, a case in which the main data bus 132 has a data width of 64 bits will be described as an example. In this case, the total data width of the first internal data buses of the first memory rank 110 and the total data width of the second internal data buses of the second memory rank 120 may be each 64 bits. The words "simultaneous" and "simultaneously" as used herein with respect to processes mean that the processes take place on overlapping intervals of time. For example, if a first process takes place over a first interval of time and a second process takes place simultaneously over a second interval of time, then the first and second intervals of time at least partially overlap each other such that there exists a time at which the first and second processes are both taking place.

Each of the memory chips CHIP00-CHIP03 of the first memory rank 110, in an embodiment, may have the first internal data bus having a data width of 16 bits. The data width of each of the first internal data buses may be a value (i.e., 16) obtained by dividing the data width (i.e., 64 bits) of the main data bus 132 by the number (i.e., 4) of the memory chips CHIP00-CHIP03 of the first memory rank 110. Similarly, each of the memory chips CHIP10-CHIP13 of the second memory rank 120, in an embodiment, may have the second internal data bus having a data width of 16 bits. The data width of each of the second internal data buses may also be a value (i.e., 16) obtained by dividing the data width (i.e., 64 bits) of the main data bus 132 by the number (i.e., 4) of the memory chips CHIP10-CHIP13 of the second memory rank 120. Although not shown in FIG. 1, when each of the first memory rank 110 and the second memory rank 120 further includes an error correction code (ECC) chip having a data width of 16 bits, the total data width of the first internal data buses of the first memory rank 110 and the total data width of the second internal data buses of the second memory rank 120 may be each 80 bits. In this case, the main data bus 132 may also have a data width of 80 bits.

The first chip selecting line 133 may be disposed between the first memory rank 110 and the memory controller 200. The memory chips CHIP00-CHIP03 of the first memory rank 110 may receive a first chip selecting signal CS0 in common through the first chip selecting line 133. That is, the memory chips CHIP00-CHIP03 of the first memory rank 110 may be simultaneously selected or not selected by the first chip selecting signal CS0. The second chip selecting line 134 may be disposed between the second memory rank 120 and the memory controller 200. The memory chips CHIP10-CHIP13 of the second memory rank 120 may receive a second chip selecting signal CS1 in common through the second chip selecting line 134. That is, the memory chips CHIP10-CHIP13 of the second memory rank 120 may be simultaneously selected or not selected by the second chip selecting signal CS1. The first chip selecting line 133 and the second chip selecting line 134 may be physically separated from each other.

The memory controller 200 may control memory operations of the first memory rank 110 and the second memory rank 120. The memory controller 200 may be coupled to the command/address line 131, the main data bus 132, the first chip selecting line 133, and the second chip selecting line 134. The memory controller 200 may transmit a command CMD and an address ADDR to the first memory rank 110 and the second memory rank 120 through the command/address line 131. The memory controller 200 may transmit data to one selected memory rank from the first memory rank 110 and the second memory rank 120 through the main data bus 132. In addition, the memory controller 200 may receive data from one selected memory rank from the first memory rank 110 and the second memory rank 120 through the main data bus 132. The memory controller 200 may transmit the first chip selecting signal CS0 to the first memory rank 110 through the first chip selecting line 133. The memory controller 200 may transmit the second chip selecting signal CS1 to the second memory rank 120 through the second chip selecting line 134.

The memory controller 200 may select one of the first memory rank 110 and the second memory rank 120 through the first chip selecting signal CS0 and the second chip selecting signal CS1. In an example, when the memory controller 200 selects the first memory rank 110, the first chip selecting signal CS0 of a logic "high" level and the second chip selecting signal CS1 of a logic "low" level may be generated. The first chip selecting signal CS0 of a logic "high" level may be commonly transmitted to the memory chips CHIP00-CHIP03 of the first memory rank 110 from the memory controller 200 through the first chip selecting line 133. The second chip selecting signal CS1 of a logic "low" level may be commonly transmitted to the memory chips CHIP10-CHIP13 of the second memory rank 120 from the memory controller 200 through the second chip selecting line 134. When the number of memory ranks coupled to the memory controller 200 is greater than two, the memory ranks may be coupled to the memory controller 200 through physically separated chip selecting lines. In addition, the memory chips constituting each of the memory ranks may receive the same chip selecting signal from the memory controller 200.

FIG. 2 is a block diagram illustrating an embodiment of the memory controller 200 included in the memory system 10 of FIG. 1. Referring to FIG. 2, the memory controller 200 may include a command/address/chip selecting signal generator 210, a request storage 220, and a scheduler 230. The memory controller 200 may receive a request REQ from a host. As described with reference to FIG. 1, the memory controller 200 may output the command/address CMD/ADDR through the command/address line 131. The memory controller 200 may output the first chip selecting signal CS0 and the second chip selecting signal CS1 through the first chip selecting line 133 and the second chip selecting line 134, respectively. Although omitted from FIG. 2, the memory controller 200 may receive or transmit data from or to the host. In addition, the memory controller 200 may receive or transmit data through the main data bus (132 in FIG. 1).

The command/address/chip selecting signal generator 210 may receive the request REQ, a target memory rank RANK, and an address ADDR from the request storage 220. The target memory rank RANK is the memory rank specified by the request REQ among a plurality of memory ranks. The command/address/chip selecting signal generator 210 may generate and output the command CMD, the address ADDR, the first chip selecting signal CD0, and the second chip selecting signal CS1 corresponding to the request REQ, the target memory rank RANK, and the address ADDR transmitted from the request storage 220. As described with reference to FIG. 1, the command CMD and the address ADDR may be transmitted to both the first memory rank 110 and the second memory rank 120. On the other hand, the first chip selecting signal CS0 may be transmitted only to the first memory rank 110, and the second chip selecting signal CS1 may be transmitted only to the second memory rank 120.

The request storage 220 may receive the request REQ and the address ADDR from the host. In an example, the request REQ may be a read request for the first memory rank 110 or the second memory rank 120. In another example, the request REQ may be a write request for the first memory rank 110 or the second memory rank 120. When the first memory rank 110 and the second memory rank 120 perform an arithmetic operation together, the request REQ may be an arithmetic request for the first memory rank 110 or for the second memory rank 120. When the request REQ is a write request, although not shown in FIG. 2, the request storage 220 may receive write data from the host. The request storage 220 may include a read request storage that stores a read request and a write request storage that stores a write request. The request storage 220 may transmit the stored requests to the command/address/chip selecting signal generator 210 according to the order determined by the scheduler 230.

The scheduler 230 may receive the request REQ transmitted from the host. The scheduler 230 may monitor the states of the requests stored in the request storage 220. The scheduler 230 may determine whether to perform rank transition between the first memory rank 110 and the second memory rank 120 by referring to the monitored states of the requests. The rank transition represents a change in the order of processing between the first memory rank 110 and the second memory rank 120. In an example, when one of the requests for the first memory rank 110 is designated by a pointer among the requests stored in the request storage 220, the scheduler 230 may determine whether to process the requests for the first memory rank 110 first or to process the requests for the second memory rank 120 first, referring to the states of the requests for the first memory rank 110 and the states of the requests for the second memory rank 120, before processing the request designated by the pointer. When the states of the requests for the first memory rank 110 do not satisfy a transition condition, whereas the states of the requests for the second memory rank 120 satisfy the transition condition, the scheduler 230 may perform a transition operation. Here, the transition operation may refer to an operation of processing the request of another memory rank first instead of the memory rank of the request target designated by the current pointer. The scheduler 230 may perform the transition operation so that the requests for the second memory rank 120 are processed first instead of the requests for the first memory rank 110 designated by the current pointer.

FIG. 3 is a diagram illustrating an embodiment of the request storage 220 included in the memory controller 200 of FIG. 2. The request storage 220 presented in FIG. 3 may be a read request storage, a write request storage, or may include both of the read request storage and the write request storage. Hereinafter, a case in which the request storage 220 is the write request storage will be taken as an example.

Referring to FIG. 3, the request storage 220 may include a plurality of request entries (i.e., $1^{ST}$ ENTRY, $2^{ND}$ ENTRY, . . . $8^{TH}$ ENTRY). For convenience, request entries may be referred herein as entries. In this embodiment, a case in which the request storage 220 includes first to eighth entries or first to eighth request entries will be taken as an example. Each of the first to eighth entries or first to eight request entries may be empty or may include one write request REQ_W. In addition, each of the first to eighth entries may include a target memory rank RANK, an address ADDR, a write data WD, and a state of readiness (e.g., A (01)). The target memory rank RANK may indicate a memory rank on which an access operation according to the request, that is, a write operation is performed. The state of readiness may be defined as a state in which a command and an address can be issued from the memory controller to a memory rank within a predetermined issue timing. Here, the issue timing may be determined to conform to rules set as standards by the joint electron device engineering council (JEDEC). In an example, the state of readiness may include a first state of readiness A, a second state of readiness B, and a third state of readiness C. The first state of readiness A may be defined as a state indicating that a request is not currently ready, but can be readyable within a margin. Here, the margin may mean a certain amount of time added to the issue timing. Accordingly, the request in the first state of readiness A may not be issued to the memory rank within the issue timing at the present time, but may be issued to the memory rank within the issue timing after a certain period of time has elapsed. The second state of readiness B will be defined as a state indicating that a request is currently being ready. The third state of readiness C may be defined as a state indicating that the request is not currently ready and cannot be ready even within the margin. In several examples below, the requests in the first state of readiness and second state of readiness may be defined as "available requests". In an example, each of the first, second, and third states of readiness A, B, and C may be stored as binary data in the entry. For example, the first state of readiness A may be stored in the entry as the value of "01", the second state of readiness B may be stored in the entry as the value of "00", and the third state of readiness C may be stored in the entry as the value of "10".

As illustrated in FIG. 3, a first write request REQ_W0, a first memory rank RANK0, a first address ADDR0, a first write data WD0, and the first state of readiness A may be stored in the first entry. A second write request REQ_W1, the first memory rank RANK0, a second address ADDR1, a second write data WD1, and the second state of readiness B may be stored in the second entry. A third write request REQ_W2, a second memory rank RANK1, a third address ADDR2, a third write data WD2, and the third state of readiness C may be stored in the third entry. A fourth write request REQ_W3, the first memory rank RANK0, a fourth address ADDR3, a fourth write data WD3, and the third state of readiness C may be stored in the fourth entry. A fifth write request REQ_W4, the second memory rank RANK1, a fifth address ADDR4, a fifth write data WD4, and the first state of readiness A may be stored in the fifth entry. A sixth write request REQ_W5, the second memory rank RANK1, a sixth address ADDR5, a sixth write data WD5, and the first state of readiness A may be stored in the sixth entry. A seventh write request REQ_W6, the second memory rank RANK1, a seventh address ADDR6, a seventh write data WD6, and the third state of readiness C may be stored in the seventh entry. An eighth write request REQ_W7, the second memory rank RANK1, an eighth address ADDR7, an eighth write data WD7, and the second state of readiness B may be stored in the eighth entry.

The write request REQ_W, the target memory rank RANK, and the address ADDR of the entry designated by the pointer among the first to eighth entries may be transmitted to the command/address/chip selecting signal generator (210 in FIG. 2). The pointer may designate the entry to be currently processed among the first to eighth entries by the scheduling operation of the scheduler (230 in FIG. 2). In an example, when the pointer designates the first entry, the request storage 220 may transmit the first write request REQ_W0, the first memory rank RANK0, and the first address ADDR0 of the first entry to the command/address/chip selecting signal generator (210 in FIG. 2). In another example, when the pointer designates the third entry, the request storage 220 may transmit the third write request REQ_W2, the second memory rank RANK1, and the third address ADDR2 of the third entry to the command/address/chip selecting signal generator (210 in FIG. 2).

Figure 4:
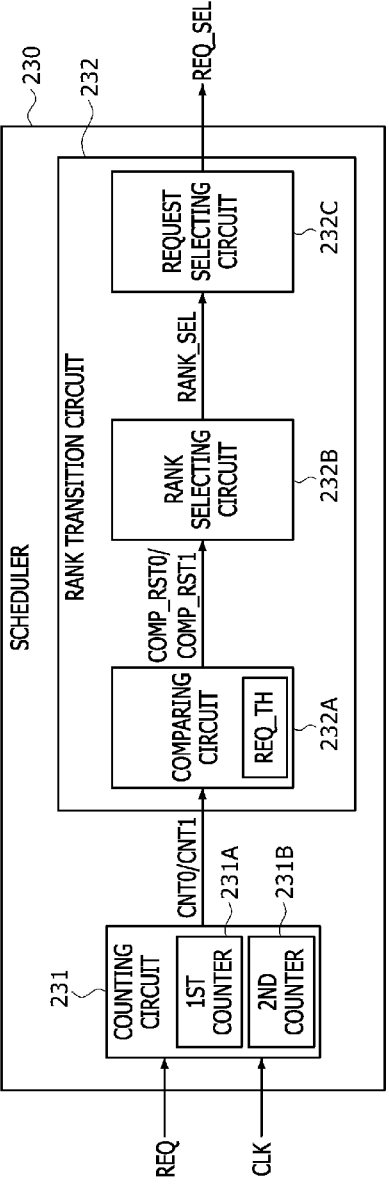
FIG. 4 is a diagram illustrating an embodiment of a scheduler included in the memory controller of FIG. 2.

FIG. 4 is a diagram illustrating an embodiment of the scheduler 230 included in the memory controller 200 of FIG. 2. Referring to FIG. 4, the scheduler 230 may include a counting circuit 231 and a rank transition circuit 232.

The counting circuit 231 may receive the request REQ from the host. In addition, the counting circuit 231 may receive a clock signal CLK. The counting circuit 231 may include a plurality of counters respectively allocated to the memory ranks. As described above with reference to FIG. 1, when the memory system 10 includes the first memory rank (110 in FIG. 1) and the second memory rank (120 in FIG. 1), the counting circuit 231 may include a first counter 231A that counts the requests for the first memory rank 110 and a second counter 231B that counts the requests for the second memory rank 120.

The first counter 231A may perform an up-counting operation of increasing the number of requests whenever a request for which the first memory rank 110 is the target memory rank is transmitted from the host. In addition, the first counter 231A may perform a down-counting operation of decreasing the number of requests whenever a request for which the first memory rank 110 is the target memory rank is output from the request storage (220 in FIG. 2). The first counter 231A may perform the up-counting operation on the requests in the first state of readiness ("A" in FIG. 3) and the requests in the second state of readiness ("B" in FIG. 3) among the requests for the first memory rank 110 as the target memory rank RANK. That is, the first counter 231A might not perform the up-counting operation on the requests in the third state of readiness ("C" in FIG. 3).

The second counter 231B may perform the up-counting operation of increasing the number of requests whenever the request for which the second memory rank 120 is the target memory rank is transmitted from the host. In addition, the second counter 231B may perform the down-counting operation of decreasing the number of requests whenever the request for which the second memory rank 120 is the target memory rank is output from the request storage (220 in FIG. 2). The second counter 231B may perform the up-counting operation on the requests in the first state of readiness ("A" in FIG. 3) and the requests in the second state of readiness ("B" in FIG. 3) among the requests with the second memory rank 120 as the target memory rank RANK. That is, the second counter 231B might not perform the up-counting operation on the requests in the third state of readiness ("C" in FIG. 3).

The first counter 231A may output a first counting value CNT0 and a second counting value CNT1 in synchronization with the clock signal CLK. In an example, the clock signal CLK may be a signal that is synchronized with a point in time when the pointer is moved within the request storage (220 in FIG. 2). The first counting value CNT0 output from the first counter 231A may represent the number of requests in the first state of readiness A and the second state of readiness B for the first memory rank 110, stored in the request storage (220 in FIG. 2). The second counter 231B may output the second counting value CNT1 whenever the up-counting operation and the down-counting operation are performed. The second counting value CNT1 output from the second counter 231B may represent the number of requests in the first state of readiness A and the second state of readiness B for the second memory rank 120, stored in the request storage (220 in FIG. 2).

The rank transition circuit 232 of the scheduler 230 may receive the first counting value CNT0 and the second counting value CNT1 from the counting circuit 231. The rank transition circuit 232 may perform a rank transition operation of selecting a memory rank by referring to the first counting value CNT0 and the second counting value CNT1, and perform a request selecting operation that gives priority to the requests for the selected memory rank. The rank transition circuit 232 may include a comparing circuit 232A, a rank selecting circuit 232B, and a request selecting circuit 232C.

The comparing circuit 232A may receive the first counting value CNT0 and the second counting value CNT1 from the counting circuit 231. A request threshold value REQ_TH may be set in the comparing circuit 232A. The request threshold value REQ_TH may be appropriately selected under conditions that prevent access to a specific memory rank from being biased. The comparing circuit 232A may compare the first counting value CNT0 with the request threshold value REQ_TH to generate and output a first comparing result value COMP_RST0. In addition, the comparing circuit 232A may compare the second counting value CNT1 with the request threshold value REQ_TH to generate and output a second comparing result value COMP_RST1.

The comparing circuit 232A may generate the first comparing result value COMP_RST0 of a first logic level, for example, a logic "low" level when the first counting value CNT0 is less than the request threshold value REQ_TH. On the other hand, when the first counting value CNT0 is equal to or greater than the request threshold value REQ_TH, the comparing circuit 232A may generate the first comparing result value COMP_RST0 of a second logic level, that is, a logic "high" level. The comparing circuit 232A may generate the second comparing result value COMP_RST1 having a first logic level when the second counting value CNT1 is less than the request threshold value REQ_TH. On the other hand, when the second counting value CNT1 is equal to or greater than the request threshold value REQ_TH, the comparing circuit 232A may generate the second comparing result value COMP_RST1 having a second logic level.

The rank selecting circuit 232B may receive the first comparing result value COMP_RST0 and the second comparing result value COMP_RST1 output from the comparing circuit 232A. The rank selecting circuit 232B may perform a rank transition operation by referring to the first comparing result value COMP_RST0 and the second comparing result value COMP_RST1. Specifically, the rank selecting circuit 232B may determine whether to perform the rank transition operation, based on the first comparing result value COMP_RST0 and the second comparing result value COMP_RST1. The rank selecting circuit 232B may generate and output a rank selecting signal RANK_SEL according to a result of determination. The rank selecting signal RANK_SEL may designate the first memory rank (110 in FIG. 1), or designate the second memory rank (120 in FIG. 1).

A case in which the number of requests for the first memory rank (110 in FIG. 1) reaches the request threshold value REQ_TH and the number of requests for the second memory rank (120 in FIG. 1) does not reach the request threshold value REQ_TH will be taken as an example. In this case, the rank selecting circuit 232B may receive the first comparing result value COMP_RST0 of a second logic level and the second comparing result value COMP_RST1 of a first logic level from the comparing circuit 232A. The rank selecting circuit 232B may perform or not perform the rank transition operation according to which target memory rank the current pointer designates in the request storage 220. When the current pointer in the request storage (220 in FIG. 2) designates a request for which the first memory rank 110 is the target memory rank, the rank selecting circuit 232B might not perform the rank transition operation. In this case, the rank selecting circuit 232B may generate and output the rank selecting signal RANK_SEL that designates the first memory rank (110 in FIG. 1) as the target memory rank RANK, for example, the rank selecting signal RANK_SEL of a first logic level. On the other hand, when the current pointer in the request storage (220 in FIG. 2) designates a request for which the second memory rank 120 is the target memory rank, the rank selecting circuit 232B may perform the rank transition operation. That is, the rank selecting circuit 232B may perform the rank transition operation of changing the target memory rank RANK from the second memory rank (120 in FIG. 1) to the first memory rank (110 in FIG. 1). Even in this case, the rank selecting circuit 232B may generate and output the rank selecting signal RANK_SEL that designates the first memory rank (110 in FIG. 1) as the target memory rank RANK, for example, the rank selecting signal RANK_SEL of a first logic level.

The request selecting circuit 232C may receive the rank selecting signal RANK_SEL output from the rank selecting circuit 232B. The request selecting circuit 232C may select a request to be processed with priority among the requests for the memory ranks selected by the rank selecting signal RANK_SEL, and generate the request selecting signal REQ_SEL designating the selected request to transmit the request selecting signal REQ_SEL to the request storage (220 in FIG. 2). When there is a request in the second state of readiness B, that is, the request of the currently ready state among the requests for the memory rank selected by the rank selecting signal RANK_SEL, the request selecting circuit 232C may select the request in the second state of readiness B. When there is no request in the second state of readiness B among the requests for the memory rank selected by the rank selecting signal RANK_SEL, the request selecting circuit 232C may select the request in the first state of readiness A, that is, the request of readyable state within the margin.

Figure 5:
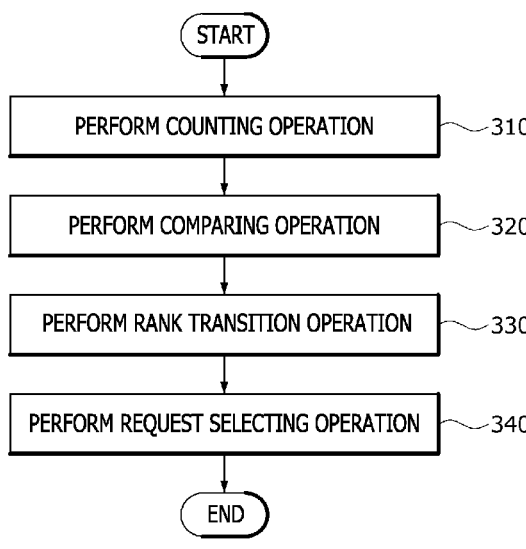
FIG. 5 is a flowchart illustrating a method of operating a memory system according to the present disclosure.

FIG. 5 is a flowchart illustrating a method of operating the memory system 10 according to an embodiment of the present disclosure. Referring to FIG. 5, together with FIG. 1, the memory system 10 may include the first memory rank 110, the second memory rank 120, and the memory controller 200, as described with reference to FIG. 1. As described with reference to FIG. 4, the scheduler 230 of the memory controller 200 may include the counting circuit 231 and the rank transition circuit 232. The rank transition circuit 232 may include the comparing circuit 232A, the rank selecting circuit 232B, and the request selecting circuit 232C.

The counting circuit 231 included in the scheduler 230 of the memory controller 200 may perform a counting operation on the requests transmitted from the host and the request output from the request storage 220 of the memory controller 200 (step 310). The scheduler 230 may perform an up-counting operation on the requests transmitted from the host. The scheduler 230 may perform a down-counting operation on the requests output from the request storage 220. The comparing circuit 232A included in the rank transition circuit 232 of the scheduler 230 may perform a comparing operation of comparing the counting value generated by the counting operation in step 310 with a request threshold value (step 320). The rank selecting circuit 232B included in the rank transition circuit 232 of the scheduler 230 may perform a rank transition operation, based on a result of the comparing operation in step 320 (step 330). The request selecting circuit 232C included in the rank transition circuit 232 of the scheduler 230 may perform a request selecting operation, based on a result of the rank transition operation in step 330 (step 340).

Figure 6:
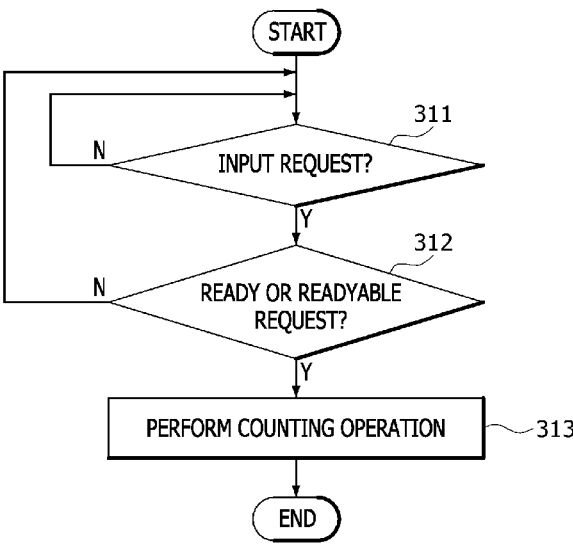
FIG. 6 is a flowchart illustrating an embodiment of a counting operation in the method of operating a memory system according to the present disclosure.

FIG. 6 is a flowchart illustrating an embodiment of the counting operation in the method of operating the memory system 10 according to an embodiment of the present disclosure. The counting operation according to the present embodiment may be applied to the up-counting operation of the counting operation in step 310 of the flowchart of FIG. 5.

Referring to FIG. 6, together with FIG. 4, the counting circuit 231 of the scheduler 230 may determine whether a request is input (step 311). When a request is not input to the counting circuit 231 in step 311, the counting circuit 231 may maintain a standby state. When a request is input to the counting circuit 231 in step 311, the counting circuit 231 may determine whether the request is in a ready state (e.g., a ready request) or that can be in a ready state (i.e., a readyable request) (step 312). The request in a ready state may be defined as a request that may be output from the request storage 220 in response to the request of the scheduler 230. The request that can be in a ready state may be defined as a request that can be output from the request storage 220 within a margin in response to the request of the scheduler 230. In an embodiment, the margin may be set to a range of clock signals. When the request input to the counting circuit 231 is not the request in a ready state and is not the request that can be in a ready state in step 312, the counting circuit 231 may maintain a standby state. That is, in this case, the counting circuit 231 might not perform the up-counting operation. When the request input to the counting circuit 231 is a request in a ready state or a request that can be in a ready state in step 312, the counting circuit 231 may perform the up-counting operation (step 313). That is, in this case, the counting circuit 231 may increase the counting value CNT by "1". The counting circuit 231 may output the counting value CNT increased by "1" to the rank transition circuit 232 of the scheduler 230 in synchronization with the clock signal CLK.

In the process of performing step 313 of FIG. 6, the counting circuit 231 may independently perform the up-counting operation and the counting value output operation according to the target memory rank, as described with reference to FIG. 4. That is, when the target memory rank of the request input to the counting circuit 231 is the first memory rank 110 and the request is a request in a ready state or a request that can be in a ready state, the first counter 231A of the counting circuit 231 may perform the up-counting operation. On the other hand, the second counter 231B of the counting circuit 231 might not perform the up-counting operation. When the target memory rank of the request input to the counting circuit 231 is the second memory rank 120 and the request is a request in a ready state or a request that can be in a ready state, the second counter 231B of the counting circuit 231 may perform the up-counting operation. On the other hand, the first counter 231A of the counting circuit 231 might not perform the up-counting operation.

Figure 7:
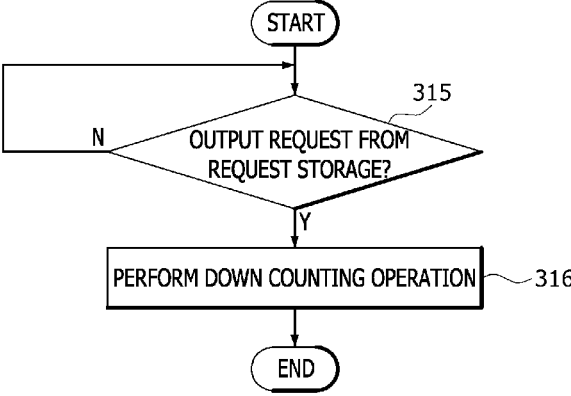
FIG. 7 is a flowchart illustrating another embodiment of the counting operation in the method of operating a memory system according to the present disclosure.

FIG. 7 is a flowchart illustrating another embodiment of the counting operation in the method of operating the memory system according to an embodiment of the present disclosure. The counting operation according to the present embodiment may be applied to the down-counting operation of the counting operation in step 310 of the flowchart of FIG. 5.

Referring to FIG. 7, together with FIGS. 2 and 4, the counting circuit 231 of the scheduler 230 may determine whether the request is output from the request storage 220 (step 315). When a request is not output from the request storage 220 in step 315, the counting circuit 231 may maintain a standby state. That is, in this case, the counting circuit 231 might not perform the down-counting operation. When a request is output from the request storage 220 in step 315, the counting circuit 231 may perform the down-counting operation (step 316). That is, in this case, the counting circuit 231 may decrease the counting value CNT by "1". The counting circuit 231 may output the counting value CNT decreased by "1" to the rank transition circuit 232 of the scheduler 230.

In the process of performing step 316 of FIG. 7, as described with reference to FIG. 4, the counting circuit 231 may independently perform the down-counting operation and the counting value output operation according to the target memory rank. That is, when the target memory rank of the request output from the request storage 220 is the first memory rank 110, the first counter 231A of the counting circuit 231 may perform the down-counting operation. On the other hand, the second counter 231B of the counting circuit 231 might not perform the down-counting operation. When the target memory rank of the request output from the request storage 220 is the second memory rank 120, the second counter 231B of the counting circuit 231 may perform the down-counting operation. On the other hand, the first counter 231A of the counting circuit 231 might not perform the down-counting operation.

Figure 8:
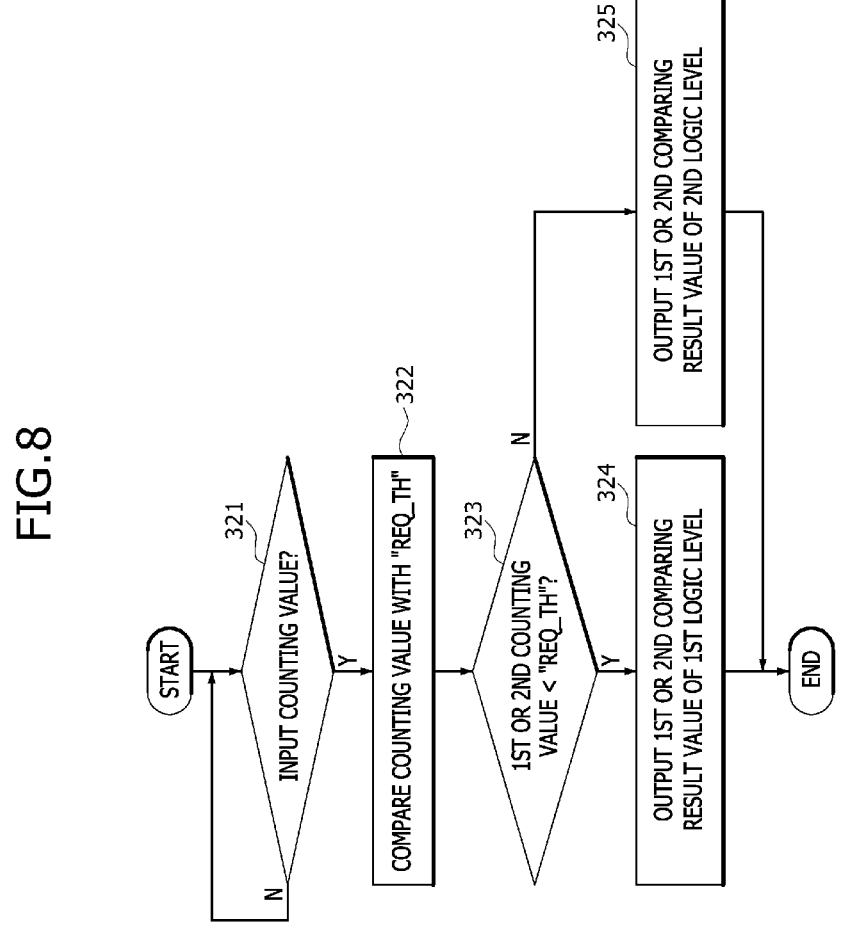
FIG. 8 is a flowchart illustrating a comparison operation in the method of operating a memory system according to the present disclosure.

FIG. 8 is a flowchart illustrating the comparing operation in the method of operating the memory system 10 according to the present disclosure.

Referring to FIG. 8, together with FIG. 4, the comparing circuit 232A included in the rank transition circuit 232 of the scheduler 230 may determine whether the counting value CNT is input from the counting circuit 231 (step 321). In step 321, when the counting value CNT is not input from the counting circuit 231, the comparing circuit 232A may maintain a standby state. In step 321, when the counting value CNT is input from the counting circuit 231, the comparing circuit 232A may compare the counting value CNT with a request threshold value REQ_TH (step 322). That is, the comparing circuit 232A may compare the first counting value CNT0 and the second counting value CNT1 with the request threshold value REQ_TH. After performing the comparing operation in step 322, the comparing circuit 232A may determine whether the first counting value CNT0 or the second counting value CNT1 is less than the request threshold value REQ_TH (step 323). In step 323, when the first counting value CNT0 is less than the request threshold value REQ_TH, the comparing circuit 232A may output the first comparing result value COMP_RST0 of a first logic level. In step 323, when the second counting value CNT1 is less than the request threshold value REQ_TH, the comparing circuit 232A may output the second comparing result value COMP_RST1 of a first logic level (step 324). In step 323, when the first counting value CNT0 is equal to or greater than the request threshold value REQ_TH, the comparing circuit 232A may output the first comparing result value COMP_RST0 of a second logic level. In addition, in step 323, when the second counting value CNT1 is equal to or greater than the request threshold value REQ_TH, the comparing circuit 232A may output the second comparing result value COM_RST1 of a second logic level (step 325).

Figure 9:
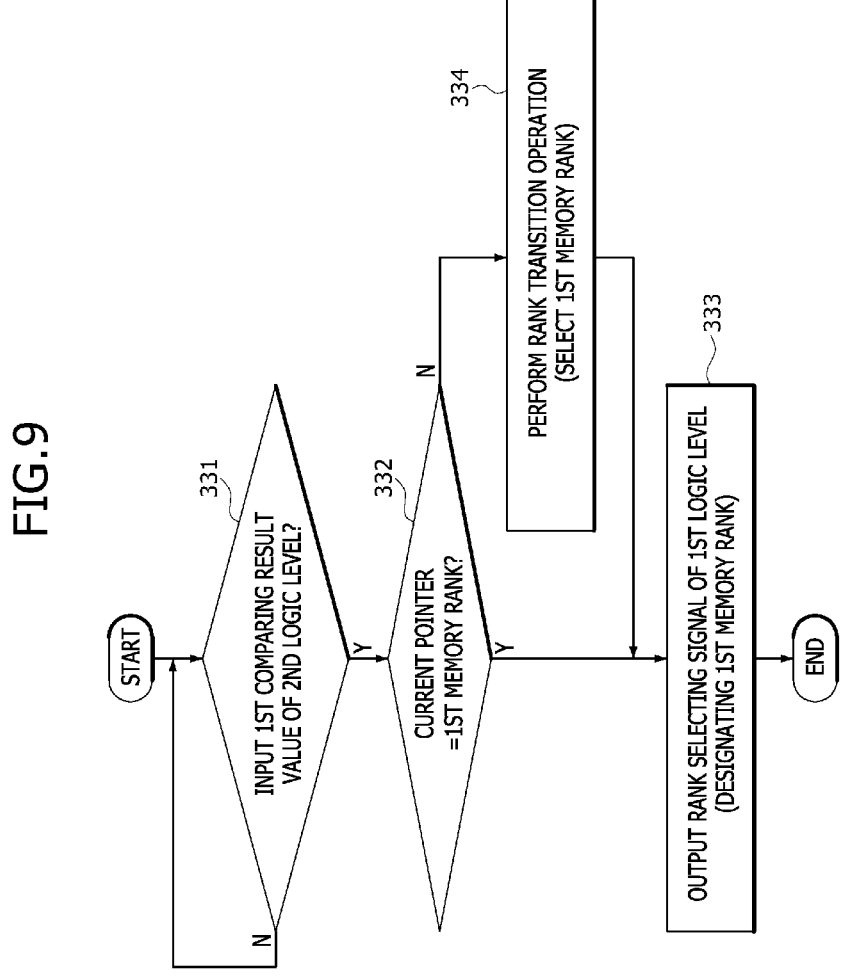
FIG. 9 is a flowchart illustrating an embodiment of a rank selecting operation in the method of operating a memory system according to the present disclosure.

FIG. 9 is a flowchart illustrating an embodiment of the rank selecting operation in the method of operating the memory system 10 according to the present disclosure. The rank selecting operation according to the present embodiment may be performed when the first comparing result value COMP_RST0 of a second logic level is input from the comparing circuit 232A. In this case, the first counting value CNT0 is equal to or greater than the request threshold value REQ_TH, and as described with reference to FIG. 4, this means that the number of requests in the first state of readiness A and the second state of readiness B for the first memory rank 110 stored in the request storage (220 in FIG. 2) is equal to or greater than the request threshold value REQ_TH.

Referring to FIG. 9, together with FIG. 4, the rank selecting circuit 232B included in the rank transition circuit 232 of the scheduler 230 may determine whether the first comparing result value COMP_RST0 of a second logic level is input (step 331). In step 331, when the first comparing result value COMP_RST0 of a second logic level is not input, the rank selecting circuit 232B may maintain a standby state. In step 331, when the first comparing result value COMP_RST0 of a second logic level is input, the rank selecting circuit 232B may determine whether the current pointer in the request storage 220 designates the request for which the first memory rank is the target memory rank (step 332). In step 332, when the current pointer in the request storage 220 designates the request for which the first memory rank 110 is the target memory rank, the rank selecting circuit 232B may output the rank selecting signal RANK_SEL of a first logic level, that is, the rank selecting signal RANK_SEL designating the first memory rank 110 (step 333). In step 332, when the pointer in the request storage 220 does not designate the request for which the first memory rank 110 is the target memory rank, that is, when the pointer designates the request for which the second memory rank 120 is the target memory rank, the rank selecting circuit 232B may perform the rank transition operation of changing the target memory rank from the second memory rank 120 to the first memory rank 110 (step 334). In addition, the rank selecting circuit 232B may output the rank selecting signal RANK_SEL of a first logic level, that is, the rank selecting signal RANK_SEL designating the first memory rank 110 (step 333).

Figure 10:
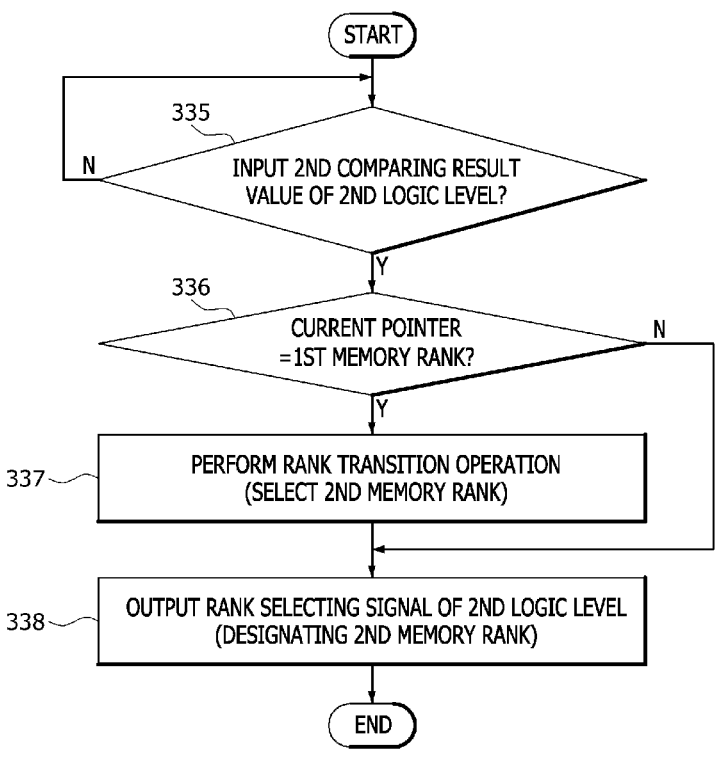
FIG. 10 is a flowchart illustrating another embodiment of the rank selecting operation in the method of operating a memory system according to the present disclosure.

FIG. 10 is a flowchart illustrating another embodiment of the rank selecting operation in the method of operating the memory system 10 according to the present disclosure. The rank selecting operation according to the present embodiment may be performed when the second comparing result value COMP_RST1 of the second logic level is input from the comparing circuit 232A. In this case, the second counting value CNT1 is equal to or greater than the request threshold value REQ_TH, and this means that the number of requests in the first state of readiness A and the second state of readiness B for the second memory rank 120 stored in the request storage (220 in FIG. 2) is equal to or greater than the request threshold REQ_TH, as described with reference to FIG. 4.

Referring to FIG. 10, together with FIG. 4, the rank selecting circuit 232B included in the rank transition circuit 232 of the scheduler 230 may determine whether the second comparing result value COM_RST1 of a second logic level is input (step 335). In step 335, when the second comparing result value COM_RST1 of a second logic level is not input, the rank selecting circuit 232B may maintain a standby state. In step 335, when the second comparing result value COM_RST1 of a second logic level is input, the rank selecting circuit 232B may determine whether the current pointer in the request storage 220 designates the request for which the first memory rank is the target memory rank (step 336). In step 336, when the current pointer in the request storage 220 designates the request for which the first memory rank 110 is the target memory rank, the rank selecting circuit 232B may perform the rank transition operation of changing the target memory rank from the first memory rank 110 to the second memory rank 120 (step 337). In addition, the rank selecting circuit 232B may output the rank selecting signal RANK_SEL of a second logic level, that is, the rank selecting signal RANK_SEL designating the second memory rank 120 (step 338). In step 336, when the current pointer in the request storage 220 does not designate the request for which the first memory rank 110 is the target memory rank, that is, when the current pointer in the request storage 220 designates the request for which the second memory rank 120 is the target memory rank, the rank selecting circuit 232B may output the rank selecting signal RANK_SEL of a second logic level, that is, the rank selecting signal RANK_SEL designating the second memory rank 120 (step 338).

FIG. 11 is a flowchart illustrating the request selecting operation in the method of operating the memory system 10 according to the present disclosure.

Referring to FIG. 11, together with FIG. 4, the request selecting circuit 232C included in the rank transition circuit 232 of the scheduler 230 may determine whether the rank selecting signal RANK_SEL of a first logic level or the rank selecting signal RANK_SEL of a second logic level is input (step 341). In step 341, when the rank selecting signal RANK_SEL of a first logic level or the rank selecting signal RANK_SEL of a second logic level is not input, the request selecting circuit 232C may maintain a standby state. In step 341, when the rank selecting signal RANK_SEL of a first logic level or the rank selecting signal RANK_SEL of a second logic level is input, the request selecting circuit 232C may determine whether a request of a ready state (i.e., a request in the second state of readiness B) exists among the requests for the target memory rank in the request storage 220 (step 342). When a request of a ready state exists in step 342, the request selecting circuit 232C may output the request selecting signal REQ_SEL for selecting the request of a ready state (step 343). When there is no request of a ready state in step 342, the request selecting circuit 232C may output the request selecting signal REQ_SEL for selecting the request of readyable state (i.e., a request in the first state of readiness A) (step 344).

FIG. 12 is a diagram illustrating an example of a method of operating the memory system 10 according to the present disclosure. In FIG. 12, a table shown at the top of FIG. 12 represents states in which requests are stored in the request storage (220 of FIG. 2), which is the same as the states of the request storage 220 described with reference to FIG. 3. A table shown at the bottom of FIG. 12 represents the counting values CNT0 and CNT1 of the counting circuit (231 of FIG. 4) of the scheduler (230 of FIG. 4) and the request threshold REQ_TH. In this example, a case in which a pointer PTR designates the first memory rank RANK0 as a target memory rank and the second request REQ_W1 in the second state of readiness B in the request storage 220 will be taken as an example. In addition, in this example, it is assumed that the request threshold REQ_TH is set to "3".

Referring to FIG. 12, together with FIG. 4, the target memory rank of each of the first, second, and fourth requests REQ_W0, REQ_W1, and REQ_W3 among the first to eighth write requests REQ_W0-REQ_W7 stored in the request storage 220 is the first memory rank RANK0. On the other hand, the target memory rank of each of the third, fifth, sixth, seventh, and eighth requests REQ_W2, REQ_W4, REQ_W5, REQ_W6, and REQ_W7 among the first to eighth write requests REQ_W0-REQ_W7 is the second memory rank RANK1. Among the first, second, and fourth requests REQ_W0, REQ_W1, and REQ_W3 having the first memory rank RANK0 as the target memory rank, the requests in the first state of readiness A or the second state of readiness B are the first and second requests REQ_W0 and REQ_W1. Among the third, fifth, sixth, seventh, and eighth requests REQ_W2, REQ_W4, REQ_W5, REQ_W6, and REQ_W7, requests in the first state of readiness A or the second state of readiness B are the fifth, sixth, seventh, and eighth requests REQ_W4, REQ_W5, REQ_W6, and REQ_W7. Accordingly, assuming that no request is output from the request storage 220, through the process described with reference to FIG. 6, the first counting value CNT0 and the second counting value CNT1 of the counting circuit 231 may become "2" and "4", respectively.

As described with reference to FIG. 8, when the counting circuit 231 transmits the first counting value CNT0 "2" and the second counting value CNT1 "4" to the comparing circuit 232A of the rank transition circuit 232 in synchronization with the clock signal CLK, the comparing circuit 232A may compare the first counting value CNT0 "2" and the second counting value CNT1 "4" with the request threshold REQ_TH "3". Because the first counting value CNT0 "2" is less than the request threshold REQ_TH "3" and the second counting value CNT1 "4" is greater than the request threshold REQ_TH "3", the comparing circuit 232A may output the first comparing result value COMP_RST0 of a first logic level and the second comparing result value COMP_RST1 of a second logic level.

As described with reference to FIG. 10, when the second comparing result value COMP_RST1 of a second logic level is input from the comparing circuit 232A, the rank selecting circuit 232B of the rank transition circuit 232 may determine whether the request indicated by the current pointer is a request for which the first memory rank RANK0 is the target memory rank. Because the second request REQ_W1 designated by the current pointer is a request for which the first memory rank RANK0 is the target memory rank, the rank selecting circuit 232B may perform a rank transition operation, and output the rank selecting signal RANK_SEL of a second logic level, which designates the second memory rank RANK1.

As described with reference to FIG. 11, when the rank selecting signal RANK_SEL of a second logic level is input from the rank selecting circuit 232B, the request selecting circuit 232C of the rank transition circuit 232 may determine whether there is a request in the second readiness state B among the requests with the second memory rank RANK1 as the target memory rank, that is, the third, fifth, sixth, seventh, and eighth requests REQ_W2, REQ_W4, REQ_W5, REQ_W6, and REQ_W7. Because the eighth request REQ_W7 is in the second state of readiness B, the request selecting circuit 232C may generate the request selecting signal REQ_SEL for outputting the eighth request REQ_W7 from the request storage 220 first.

Figure 13:
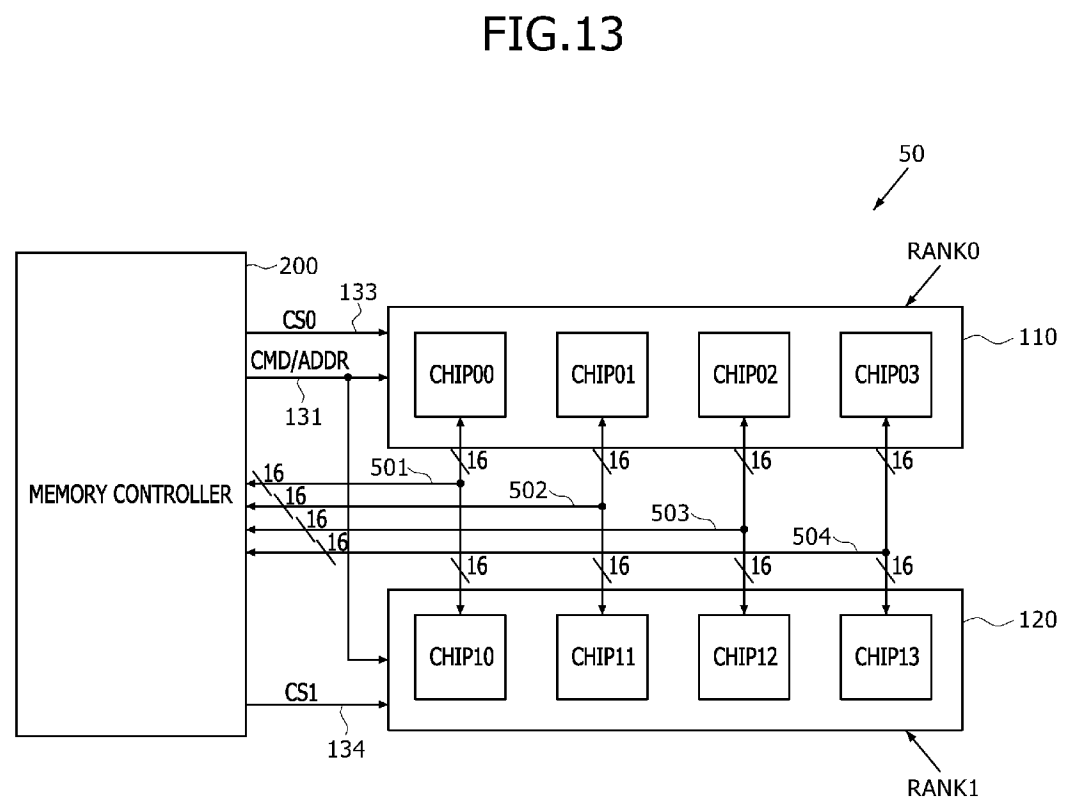

FIG. 13 is a block diagram illustrating a memory system 50 according to another embodiment of the present disclosure. In FIG. 13, the same reference numerals as those in FIG. 1 denote the same components, and duplicate descriptions will be omitted below.

Referring to FIG. 13, the memory system 50 may include a plurality of main data buses 501-504 providing data transmission paths between a first memory rank 110 and a second memory rank 120. The number of the main data buses 501-504 may be the same as the number of memory chips CHIP00-CHIP03 constituting the first memory rank 110 and the number of memory chips CHIP10-CHIP13 constituting the second memory rank 120. A plurality of first internal data buses may be disposed between the first memory rank 110 and the main data buses 501-504. Similarly, a plurality of second internal data buses may be disposed between the second memory rank 120 and the main data buses 501-504. The first internal data buses may be coupled correspondingly to the memory chips CHIP00-CHIP03 constituting the first memory rank 110. The second internal data buses may be correspondingly coupled to the memory chips CHIP10-CHIP13 constituting the second memory rank 120. A data width of each of the first internal data buses may be the same as that of each of the main data buses 501-504. Similarly, the data width of each of the second internal data buses may be the same as that of each of the main data buses 501-504. In this example, each of the main data buses 501-504, each of the first internal data buses, and each of the second internal data buses may have a data width of 16 bits. The description of the configuration and operation of the memory system (10 of FIG. 1) described with reference to FIGS. 2 to 11 may be equally applied to the memory system 50 according to the present embodiment.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:
1. A memory system comprising:
a plurality of memory ranks; and
a memory controller configured to control the plurality of memory ranks, wherein the memory controller is configured to receive a request and configured to perform a counting operation, based on the request, by counting a quantity of available requests for which each of the plurality of memory ranks is a target memory rank, to compare the results of the counting operation with a request threshold value, to select a target memory rank from among the plurality of memory ranks based on a result of the comparing, and to schedule the request corresponding to the selected target memory rank, wherein the available requests are requests having a state of readiness, wherein the state of readiness of the request is one of a first state of readiness, a second state of readiness, and a third state of readiness, wherein the first state of readiness is a state in which the request is not currently ready, but is readyable within a margin, wherein the second state of readiness is a state in which the request is currently ready, wherein the third state of readiness is a state in which the request is not currently ready and not readyable even within the margin, and wherein the available requests include a request in the first state of readiness and a request in the second state of readiness.

2. The memory system of claim 1, wherein the memory controller includes:

a request storage storing the requests; and a scheduler configured to adjust an order in which the requests stored in the request storage are output from the request storage.

3. The memory system of claim 2, wherein the request storage includes a plurality of request entries, and wherein each of the plurality of request entries stores the target memory rank of which the request will be processed and the state of readiness of the request.

4. The memory system of claim 3, wherein the scheduler includes:

a counting circuit configured to count the request of each of the plurality of memory ranks to output a plurality of counting values respectively corresponding to the plurality of memory ranks; and a rank transition circuit configured to perform a rank transition operation and a request selecting operation, based on the plurality of counting values from the counting circuit.

5. The memory system of claim 4, wherein the counting circuit includes a plurality of counters respectively corresponding to the plurality of memory ranks, and wherein each of the plurality of counters is configured to:

perform an up-counting operation when a request for a corresponding memory rank is input to the request storage; and perform a down counting operation when a request for the corresponding memory rank is output from the request storage.

6. The memory system of claim 5, wherein the state of readiness of the request is one of a first state of readiness, a second state of readiness, and a third state of readiness, wherein the first state of readiness is a state in which the request is not currently ready, but is readyable within a margin, wherein the second state of readiness is a state in which the request is currently ready, wherein the third state of readiness is a state in which the request is not currently ready and not readyable even within the margin, and wherein the counting circuit performs the up-counting operation only when the request input to the request storage is in the first state of readiness or the second state of readiness.

7. The memory system of claim 6, wherein the counting circuit outputs the plurality of counting values in response to a clock signal in synchronization with a point in time when the pointer moves in the request storage.

8. The memory system of claim 6, wherein the rank transition circuit includes:

a comparing circuit configured to compare each of the plurality of counting values with the request threshold value to output a plurality comparing result values;

a rank selecting circuit configured to output a rank selecting signal designating a target memory rank, based on the plurality comparing result values; and a request selecting circuit configured to select a request to be implemented with priority from among requests for the target memory rank, based on the rank selecting signal.

9. The memory system of claim 8, wherein the comparing circuit is configured to:

output a first comparing result value of a first logic level when a first counting value, which is one of the plurality of counting values, is less than the request threshold value, and output a first comparing result value of a second logic level when the first counting value is equal to or greater than the request threshold value.

10. The memory system of claim 8, wherein the rank selecting circuit is configured to output the rank selecting signal designating the first memory rank when a first comparing result value indicating that a first count value for a first memory rank, which is one of the plurality of memory ranks, is equal to or greater than the request threshold value that is transmitted.

11. The memory system of claim 8, wherein the request selecting circuit is configured to:

output a request selecting signal designating a request in the second state of readiness when there is the request in the second state of readiness among the requests for the target memory rank designated by the rank selecting signal, and output a request selecting signal designating a request in the first state of readiness when there is no request in the second state of readiness among the requests for the target memory rank designated by the rank selecting signal.

12. The memory system of claim 1, further comprising:

a main data bus coupled with the memory controller; and a plurality of internal data buses disposed between the plurality of memory ranks and the main data bus.

13. The memory system of claim 12, wherein a data width of the main data bus is equal to a total data width of the plurality of internal data buses.

14. The memory system of claim 13, wherein each of the plurality of memory ranks includes a plurality of memory chips correspondingly coupled to the plurality of internal data buses.

15. The memory system of claim 14, wherein a data width of each of the plurality of internal data buses is equal to a value obtained by dividing the data width of the main data bus by the number of the plurality of memory chips.

16. The memory system of claim 1, further comprising:

a plurality of main data buses coupled with the memory controller; and a plurality of internal data buses disposed between the plurality of memory ranks and the plurality of main data buses.

17. The memory system of claim 16, wherein a total data width of the plurality of main data buses is equal to a total data width of the plurality of internal data buses.

18. The memory system of claim 17, wherein each of the plurality of memory ranks includes a plurality of memory chips correspondingly coupled to the plurality of internal data buses, and wherein a data width of each of the plurality of internal data buses is equal to a data width of each of the plurality of main data buses.

19. The memory system of claim 1, further comprising a plurality of chip selecting lines disposed to be physically separated from each other between the plurality of memory ranks and the memory controller, wherein each of the plurality of memory ranks is configured to receive a chip selecting signal through the corresponding chip selecting line.

* * * * *